Figure 1:
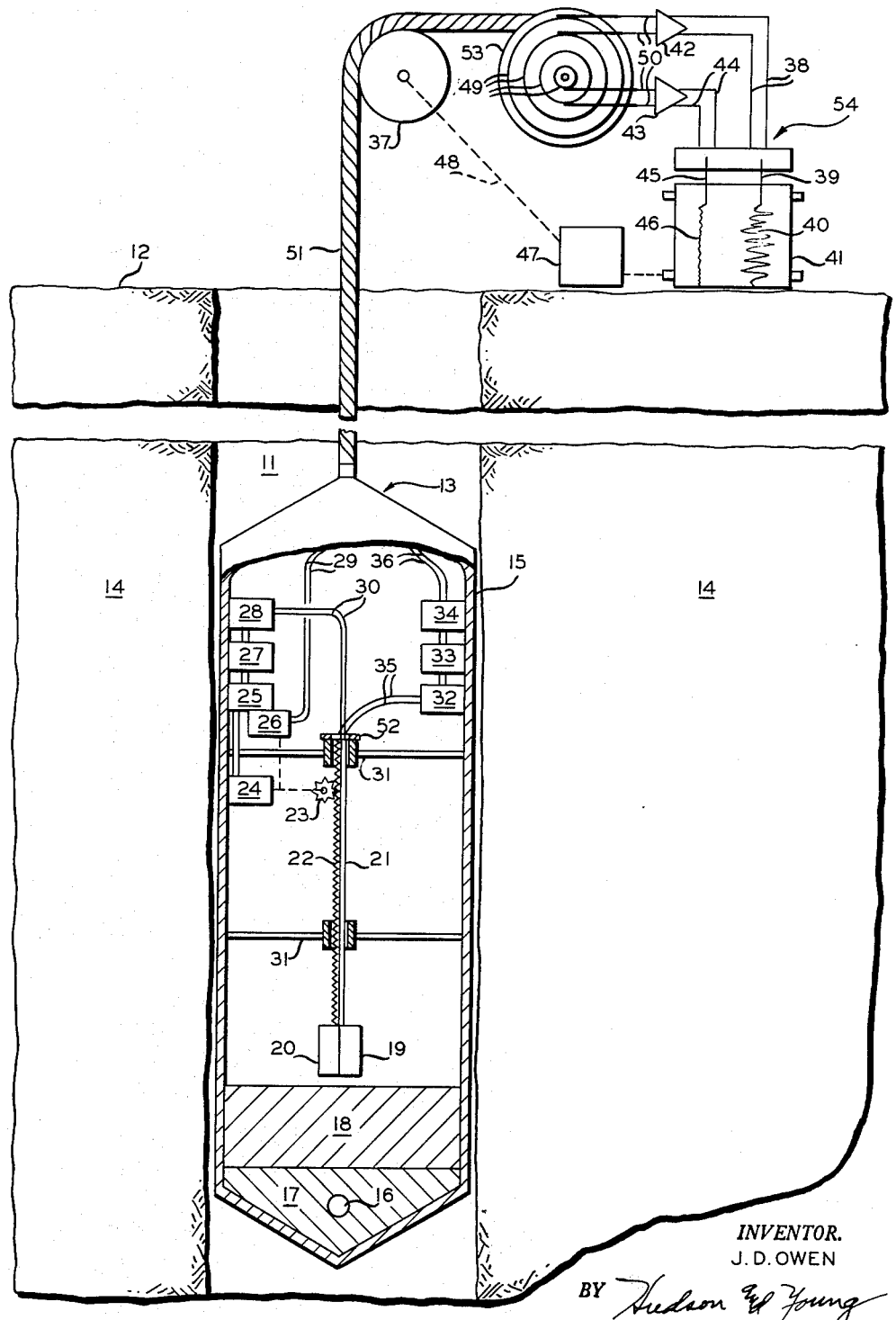

Sept. 7, 1965 J. D. OWEN 3,205,356
NEUTRON AND GAMMA RAY WELL LOGGING
Filed Dec. 12, 1960 2 Sheets-Sheet 1

INVENTOR.
J. D. OWEN
BY
ATTORNEYS

Sept. 7, 1965  J. D. OWEN  3,205,356
NEUTRON AND GAMMA RAY WELL LOGGING
Filed Dec. 12, 1960  2 Sheets-Sheet 2

INVENTOR.
J. D. OWEN
BY Hudson & Young
ATTORNEYS

United States Patent Office 3,205,356
Patented Sept. 7, 1965

3,205,356
NEUTRON AND GAMMA RAY WELL LOGGING
Joe D. Owen, Bartlesville, Okla., assignor to Phillips Petroleum Company, a corporation of Delaware
Filed Dec. 12, 1960, Ser. No. 75,363
13 Claims. (Cl. 250—83.3)

This invention relates to apparatus and a method for making a gamma ray log of downhole earth formation. In one aspect it relates to apparatus and a method for making a chlorine log of a downhole earth formation which is independent of a hydrogen log. In another aspect it relates to apparatus and a method for making a chlorine log of downhole earth formations for surveying the borehole for indications of the presence of oil.

There has been a great deal of interest and activity in the nuclear logging field concerning the logging tool or tools that will record either gamma rays of certain energies or complete gamma ray spectra. All of these tools, in general, operate on the same principle. They have a neutron source, a neutron detector which is sensitive to either thermal or epithermal neutrons, and a gamma ray detector. The neutron detector is used to give a log which is a function of the hydrogen atom density of the rock thereby indicating the presence of porosity filled with oil, water, or oil and water. The neutron detector does not give a log which is a function of a hydrogen atom density of the rocks suitable for use in prospecting for oil when the porosity of the rocks is filled with gas. The gamma ray detectors used are usually NaI-photo multiplier assemblies which give electrical pulses, the height of which are proportional to the gamman ray energies. Analyses of these electrical pulses are significant in interpreting the source rock type.

The gamma ray energy is related to the type of nucleus from which the gamma ray originates. Chlorine atoms are known to capture thermal neutrons with the emission of gamma rays of definite energies. At present, gamma ray logging tools in the field are operated on the principle that if both hydrogen and chlorine are present, then the likelihood of oil being present is low. The chlorine log usually consists of three curves, (1) a conventional gamma ray curve, (2) a conventional neutron curve, and (3) a special gamma ray curve which is designated as a chlorine curve. The interpretation of these curves is based on the following reasoning. The conventional neutron curve is essentially a record of the hydrogen atom density of the rock surrounding the borehole. Since both water and liquid hydrocarbons have about the same amount of hydrogen the neutron log does not distinguish between oil and water, but is primarily effected by porosity assuming that the porosity is completely filled with liquid. On the other hand, the chlorine curve is believed to record the relative amount of chlorine in the formation. Since chlorine is primarily contained in rock as NaCl dissolved in water, the chlorine curve is supposed to be sensitive to the presence of water and therefore allows discrimination between oil and water sections. For this statement to be true, even qualitatively, the water must contain sodium chloride and the chlorine curve must detect the presence of chlorine in an unambiguous manner.

If hydrogen is present, but the chlorine is low, the odds are good that liquid hydrocarbons are present. The low content of chlorine is believed to indicate a low content of salt water in the porosity of the rocks and with hydrogen being present then the hydrogen is believed to be present in the form of liquid hydrocarbons. The conventional chlorine curves of the prior art exhibit not only the presence of chlorine but also they include the presence of hydrogen. Thus, the problem facing the industry is to be able to obtain a chlorine curve which does not include hydrogen. A chlorine curve is obtained by observing the gamma rays resulting from neutron capture in chlorine. However, the presence of hydrogen slows down the neutrons in thermal energy more rapidly than other atoms normally present in formations surrounding well bores. They can then be captured by chlorine atoms. Furthermore, the number of gamma rays seen having a specific energy [usually about 7.5 mev. (million electron volts) and within the range of about 6.2 to about 7.7 mev. from neutron capture in chlorine] is dependent upon not only the amount of chlorine present, but the thermal neutron flux as well. This statement means that the chlorine curve is actually a chlorine-hydrogen curve. Thus the greater the amount of hydrogen, the higher will be the neutron flux, and the greater the chlorine curve, even though the chlorine content might not have increased. Thus, the problem becomes, how to get rid of the hydrogen effect on the chlorine curve.

An object of this invention is to provide an apparatus and a method for making a gamma ray log of downhole earth formations which is independent of the hydrogen log. Another object of this invention is to provide an apparatus and a method for making a chlorine log of downhole earth formations which is independent of hydrogen atom concentrations. Yet another object of this invention is to provide apparatus and a method for making a chlorine log of downhole earth formations for surveying the borehole for indications of the presence of oil. Still other objects and advantages of this invention will be realized upon reading the following description, which taken with the attached drawing, forms a part of this specification.

This invention consists in providing a logging tool which will adjust spacing between the neutron source and the gamma ray detector automatically to maintain the gamma ray detector at a point that has an essentially constant thermal neutron flux.

Figure 2:
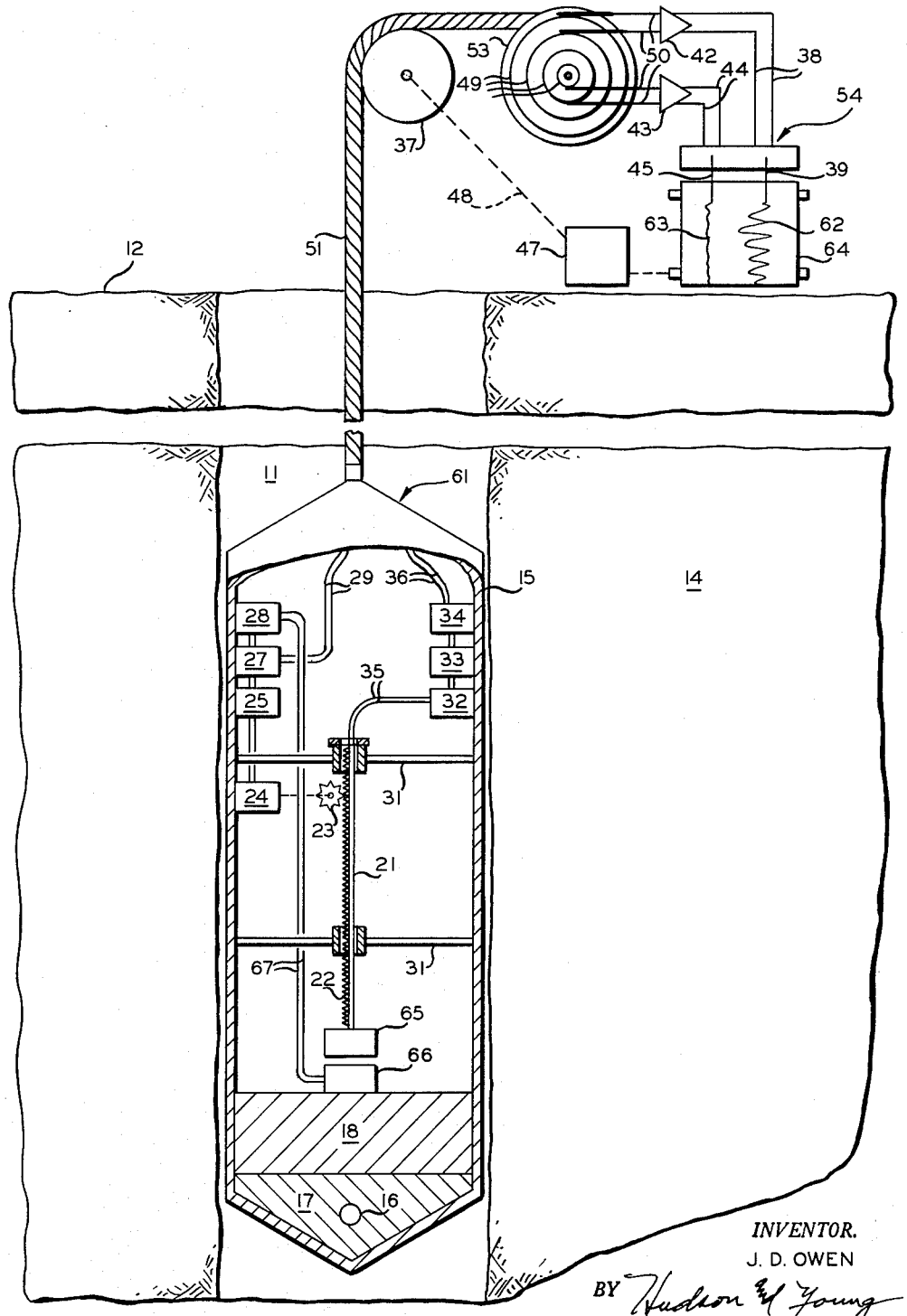

In the drawing, FIGURE 1 illustrates in diagrammatic form, one form of apparatus for achieving the objects of this invention. FIGURE 2 illustrates in diagrammatic form a second embodiment of the apparatus of this invention.

In FIGURE 1 reference numeral 11 identifies a borehole extending downward from the surface of the earth 12. Extending into the borehole is a supporting cable 51 on the lower end of which is provided a capsule 13 containing apparatus described hereinbelow. Reference numeral 14 identifies various earth formations which are logged by the capsule 13 and associated apparatus upon moving upward and downward through the borehole 11.

The capsule 13 comprises a tubular case or housing 15 having its ends closed. In the lower portion of the closed housing 15 is disposed a neutron source 16 which is, in one embodiment, a radium-beryllium capsule. Such a capsule contains the equivalent of approximately 400 millicuries of radium. The alpha radiation of radium reacts with the beryllium to release large numbers of neutrons. The neutron flux emanating from this beryllium is of the order of $6 \times 10^6$ neutrons per second, and the average neutron energy is approximately 4 million electron volts. Other sources of neutrons can be employed such as capsules containing actinium-beryllium, polonium-beryllium, or plutonium-beryllium. An aluminum mounting 17 is positioned surrounding the source of neutrons 16. To reduce the number of neutrons and other radiations from directly reaching other apparatus in the capsule 15, a lead or tungsten shield 18 is provided immediately above the aluminum mounting.

Above the top surface of shield 18 is positioned a gamma ray detector 19 and a neutron detector 20. The cases of these two detectors are attached mechanically to each other so that they will move together. Detector 19 can be a Geiger counter insensitive to neutrons. Such a detector is described on page 55 of Tracerlab, Catalog D, Tracerlab, Inc., 130 High Street, Boston 10, Massachusetts. The gamma ray detector 19 and the thermal neutron detector 20 are supported on the lower end of a tubular member 21. This tubular member 21 has on one side and extending vertically throughout its length a rack 22 operatively fitting a pinion gear 23. This pinion gear 23 is rotated in one direction or the other by a reversible servo motor 24. Several guide members 31 are attached to the inner walls of the tubular casing 15 and extend radially inward to hold tubular member 21 in a vertical position such that the pinion gear 23 will be meshed with the teeth of the rack at all times. A lug 52 is attached to the upper end of the tubular member 21 so that the rack 22 cannot move downward and out of contact with pinion gear 23. If desired, however, lug 52 need not be used when the gamma ray detector 19 and neutron detector 20 are so positioned on the bottom end of the tubular member 21 that these detectors touch or contact the upper surface of shield 18 with the upper end of the rack 22 and tubular member 21 being within the adjacent ends of the upper guide members 31.

A pair of lead wires 35 extends from the gamma ray detector 19 through the tubular member 21 to a preamplifier 32. This preamplifier amplifies the signals from detector 19 with the amplified signal being passed on to a pulse height analyzer 33. A signal from the pulse height analyzer 33 is transmitted to a cathode follower amplifier 34 which in turn couples the signal to the transmission lines 36 which transmit the signals to the wellhead.

The gamma ray detector system, referred to above, can be used for the detector 19, preamplifier 32 and the pulse height analyzer 33. The cathode follower amplifier 34 is intended to couple the signal from the pulse height analyzer to the elongated lead wires 36. Since this logging apparatus is on occasions lowered downward through deep wells of 10 to 15 thousand feet lead wires. 36 are relatively long, cathode follower amplifier 34 is required for passage of a signal for use at the surface in recording the chlorine curve on a chart as subsequently described.

A pair of lead wires 30 lead from the thermal neutron detector 20, referred to hereinafter, to an amplifier 28. This amplifier amplifies the signal from detector 20 and passes the amplified signal on to a cathode follower amplifier 27 which emits a signal proportional to the amplified signal from amplifier 28 for passage to a servo amplifier 25. The servo amplifier 25 emits a signal for operation of a servo motor 24 which is as mentioned hereinabove a reversible servo motor. The servo amplifier 25 also emits a signal to the position potentiometer 26 which in turn communicates with the reversible servo motor 24 in such a manner as to indicate by a signal the position of the neutron detector 20 with respect to the source of neutron 16. This position potentiometer 26 emits this signal which is transmitted upward through lead wires 29 to the wellhead for recording on a chart as will be described hereinafter. The several pairs of lead wires 36 and 29, which extend from the apparatus in capsule 13 upward to the wellhead, are enclosed within a supporting cable 51 which carries the weight of this downhole capsule.

The thermal neutron detector 20 can be a boron fluoride detector such as illustrated and described in Nucle-onics, volume 15, No. 6, June 1957, page 93, and manufactured by Anton Electronic Laboratories, Inc., 1226 Flushing Avenue, Brooklyn 37, New York. The servo amplifier 25 emits a signal, as mentioned above, to the position potentiometer 26 which in turn emits an amplified signal for passage through lead wires 29 up to the ground surface. A position potentiometer suitable for use in this invention is well known in the art and emits a signal in response to the rotation of a shaft from servo motor 24 connected with the pinion gear 23. This signal emitted from the position potentiometer 26 and transmitted upward through lead wires 29 is used for obtaining a trace 46 on a chart. The electrical signals from the gamma ray detector and from the position potentiometer are carried to the surface through wires 36 and 29, respectively, as mentioned before. These wires extend with cable 51 over a measuring wheel 37 and onto the cable reel 53. From the cable reel 53 the signals are taken through slip rings 49 and brushes 50 and amplified in amplifiers 42 and 43, if necessary. These amplified signals are recorded side by side on a recorder chart 41. Pen arm 39 traces the chlorine trace 40 while pen arm 45 gives a trace of the position of detector 20, which represents a position at which the thermal neutron intensity is substantially constant. Lead wires 38 and 44 conduct the amplified impulses from the amplifiers 42 and 43, respectively, to the recorder for making the continuous record of the chlorine curve and position of detectors 19, 20, respectively. The speed at which the chart 41 moves in making the traces by pen arms 39 and 45 is correlated by a mecahnical connection 48 in conjunction with a gear box assembly 47 to a measuring wheel 37. The chart is calibrated in terms of feet or some other conventional unit corresponding to the depth in the borehole of the capsule 13. The chlorine trace 40 is a recording of the output of the γ-ray detector, suitably amplified and analyzed for pulse heights so that it is essentially proportional to the number of gamma (γ) rays being emitted due to thermal neutron capture by chlorine.

The thermal neutron detector 66 of FIGURE 2 is fixed for example to the upper surface of the lead or tungsten shield 18 and is connected with lead wires 67 to an amplifier 28. This amplifier amplifies the signal from the detector 66 and passes the signal to the cathode follower 27 which in turn emits a signal for passage through lead wires 29 to the ground surface for recording. The cathode follower also emits a signal for use in the power amplifier 25 which in turn regulates current to the servo motor 24. This servo motor 24 is connected operatively with the pinion gear meshing with rack 22 for raising and lowering the gamma ray detector 65. The gamma ray detector 65 is connected by lead wires 35 to the preamplifier 32 which in turn emits a signal for the pulse height analyzer or discriminator 33. This latter apparatus emits a signal to the cathode follower 34 which in turn emits a signal for passage through lead wires 36 to the recording apparatus above-ground. The recording apparatus of FIGURE 2 is substantially the same as that described relative to FIGURE 1. Wires 29 and 36 are enclosed within cable 51, the latter passing around measuring wheel 37 and to the reel 53. Signals from the several pairs of wires 29 and 36 are removed from the reel by way of slip rings 49 and brushes 50, amplified in amplifiers 42 and 43 if desired and the amplified currents passed on through leads 38 and 44, respectively, to the recorder instrument 54. Pen arms 39 and 45 provide traces 62 and 63, respectively, which in turn are the chlorine curve and a trace representing the thermal neutron flux, respectively, on chart 64. The movement of the chart 64 is correlated with the measuring wheel 37 in the same manner as described relative to the corresponding apparatus of FIGURE 1.

The capsule illustrated in FIGURE 2 of the drawing is identified by reference numeral 61.

This apparatus of FIGURE 2 accomplishes the same purpose as that of FIGURE 1 but only the gamma ray detector is moved, keeping the thermal neutron detector fixed in position relative to the source of neutrons. The output of the thermal neutron detector 66 then drives the servo motor 24, which is a reversible motor, in such a way as to make the distance between the neutron source and the gamma ray detector vary as the neutron flux increases or decreases in order to keep the gamma ray detector 65 at a point at which the neutron flux is substantially constant. Thus with the gamma ray detector 65 being the only movable detector this apparatus of FIGURE 2 is a little more simple than that of FIGURE 1. While this embodiment of the invention is a simpler approach to the problem it does make a satisfactory chlorine log. However, the system illustrated in FIGURE 1 is preferred.

Referring to the apparatus of FIGURE 1, the gamma ray detector 19 and the thermal neutron detector 20 are built together mechanically and move up and down together, inside the logging tool by use of the electric servo motor 24. This servo motor is driven by a servo amplifier 25 receiving its information and drive from the output of the thermal neutron detector and a position indicating potentiometer. As this tool moves through the various formations, the thermal neutron flux at any given point will vary, generally, as a function of the amount of hydrogen in the rock. As the thermal neutron flux reaching the detector increases the output of the thermal neutron detector also increases, thereby causing the servo motor to drive the rack and pinion in such a way as to move the detector away from the source of neutrons. This system is thus essentially a self-balancing system, in which the thermal neutron detector is maintained at a position at all times so the output of a netutron detector is constant. The gamma ray detector is mechanically attached to the thermal neutron detector. The output of a gamma ray detector will be a function of the amount of chlorine only and would not be dependent upon the porosity and hydrogen content of the rocks.

The thermal neutron detector and the gamma ray detector of FIGURE 2 are similar to those illustrated in FIGURE 1.

Power sources for operating the capsule instruments is not shown for purposes of simplicity and brevity. The need and use of such power source is of course well understood by those skilled in the art.

While certain embodiments of the invention have been described for illustrative purposes, the invention obviously is not limited thereto.

That which is claimed is:

1. The process of logging gamma rays in a well comprising the steps of:
generating neutrons at a predetermined position in a well at a constant rate;
exposing the natural formation surrounding the well to said generated neutrons;
shielding a portion of said well from said generated neutrons coming directly from said position of generation, but not from said formation;
measuring the intensity of thermal netutron flux from said formation at a first point in said shielded portion of said well;
determining from said intensity measurement a second point in said shielded portion of said well where there is a predetermined constant thermal neutron flux;
measuring the intensity of gamma rays at said second point;
and logging said intensity of gamma rays measured at said second point.

2. The process of logging gamma rays in a well comprising the steps of:
generating neutrons at a predetermined position in a well at a constant rate;
exposing the natural formation surrounding the well to said generated neutrons;
shielding a portion of said well from said generated neutrons coming directly from said position of generation, but not from said formation;
measuring the gamma ray intensity and the intensity of thermal neutron flux at a point in said shielded portion of said well;
moving said point relative to said position until a predetermined constant neutron flux is being measured;
and logging said gamma ray intensity at said point.

3. The process of claim 2 including logging the distance between said point and said position.

4. The process of logging gamma rays in a well comprising the steps of:
generating neutrons at a predetermined position in a well at a constant rate;
exposing the natural formation surrounding the well to said generated neutrons;
shielding a portion of said well from said generated neutrons coming directly from said position of generation, but not from said formation;
measuring the intensity of thermal neutron flux from said formation at a first point in said shielded portion of said well a constant distance from said position;
determining from said measurement of intensity of thermal neutron flux a second point where the thermal neutron flux will be a predetermined constant;
measuring the intensity of gamma rays at said second point;
and logging said intensity of gamma rays measured at said second point.

5. The process of claim 4 including logging the intensity of thermal neutron flux at said first point.

6. The process of prospecting for oil and salt in which the process of claim 3 is employed in which:
the logged distance between said point and said position is proportional to the hydrogen present in the formation;
and the logged gamma ray intensity is proportional to the chlorine present in the formation.

7. The process of prospecting for oil and salt in which the process of claim 5 is employed in which:
the logged intensity of thermal neutron flux at said first point is proportional to the hydrogen present in the formation;
and the logged gamma ray intensity is proportional to to the chlorine present in the formation.

8. A well logging device comprising in combination:
a constant source of neutrons;
a thermal neutron detector;
a gamma ray detector;
a neutron shield between said source and said thermal neutron detector;
means including said thermal neutron detector to determine a point of predetermined thermal neutron flux;
means to move said thermal neutron detector to said point;
and means connected to said gamma ray detector to record the intensity of gamma rays measured at said point by said gamma ray detector.

9. The combination of claim 8 with means to record the distance between said source and said point.

10. The combination of claim 8 with means to record the intensity of thermal neutrons detected by said thermal neutron detector.

11. A well logging device comprising in combination:
a body;
a source of neutrons mounted on said body;
a thermal neutron detector and a gamma ray detector mounted on said body;
a neutron shield between said source and said detectors;
means to move said gamma ray detector relative to said source until the gamma ray detector is at a point of predetermined constant thermal neutron flux;

means to suspend said body in said well;

and logging recording means adapted to record data on a chart from each of said detectors, said chart being movable relative to said logging recording means in response to the lowering of said body in a well.

12. The combination of claim 11 in which the thermal neutron and gamma ray detectors are movable as a unit relative to said source.

13. The combination of claim 11 in which the thermal neutron detector is a fixed distance from said source and said gamma ray detector is movable relative to said source.

References Cited by the Examiner

UNITED STATES PATENTS

| | | | |
|---|---|---|---|
| 2,285,840 | 6/42 | Scherbatskoy | 250—83.6 |
| 2,469,463 | 5/49 | Russell | 250—83.6 |
| 2,508,772 | 5/50 | Pontecorvo | 250—83.6 |
| 2,515,501 | 7/50 | Fearon et al. | 250—83.6 |
| 2,725,486 | 11/55 | Walstrom | 250—83.6 |
| 2,750,144 | 6/56 | Beckwith | 250—83.4 |
| 2,776,378 | 1/57 | Youmans | 250—83.6 |
| 2,933,609 | 4/60 | Norelius | 250—83.3 |
| 2,949,535 | 8/60 | Scherbatskoy | 250—83.6 |
| 2,963,583 | 12/60 | Lebourg | 250—83.6 |
| 2,971,094 | 2/61 | Tittle | 250—83.6 |

RALPH G. NILSON, *Primary Examiner.*